2,981,705
Patented Apr. 25, 1961

2,981,705
ALKYD RESINS MODIFIED WITH 2,5-DIHYDROXYBENZOIC ACID

Raymond L. Heinrich, Baytown, Tex., and David A. Berry, Columbus, and Robert L. Christian, Gahanna, Ohio, assignors, by mesne assignments, to Esso Research and Engineering Company, Elizabeth, N.J., a corporation of Delaware No Drawing. Filed Oct. 2, 1959, Ser. No. 843,917

3 Claims. (Cl. 260—22)

This invention relates to modified alkyd resins. More particularly, this invention relates to modified alkyd resins of improved hardness and drying characteristics.

Alkyd resins are widely used in the preparation of surface coating compositions. A particularly desired class of alkyd resins are the so-called "oil-modified" alkyd resins employed in coatings and prepared by the intercondensation of a polybasic acid (preferably dibasic), a polyol, and an unsaturated fatty acid derived from a glyceride oil.

The present invention is directed to a discovery in the field of oil-modified alkyd resins which not only permits the inclusion of 2,5-dihydroxybenzoic acid as a raw material but which also provides oil-modified alkyd resins of improved physical and chemical properties.

It has now been discovered that alkyd resins compositions of improved physical properties may be obtained by replacing from about 55 to about 65 mol percent of the fatty acid component of the alkyd resin with 2,5-dihydroxybenzoic acid. In particular, the alkyd resin coating compositions of the present invention are characterized by satisfactory drying times and the films prepared therefrom are characterized by excellent flexibility and hardness.

Alkyd resin chemistry is well known to those skilled in the art and, in the interest of brevity, will not be discussed in detail. The preparation and physical properties of alkyd resins are described in numerous texts, such as vol. I to "Organic Coating Technology," Henry Fleming Payne, John Wiley and Sons, Inc., N.Y., 1954.

The polycarboxylic acids used in the preparation of the novel alkyds may be any of those generally employed in the preparation of this type of resin. These acids may possess two, three, four, or more carboxyl groups and may be aliphatic, alicyclic, heterocyclic, or aromatic and may be saturated or unsaturated. Examples of such acids are malonic, glutaric, succinic, suberic, citric, tricarballylic, cyclohexanedicarboxylic, maleic, fumaric, itaconic, citraconic, mesaconic, phthalic, isophthalic, terephthalic, 1,8-naphthalic, adipic, sebacic, azelaic, pimelic, chlorosuccinic, bromomaleic, and dichlorophthalic.

The preferred polycarboxylic acids to be used in producing the novel alkyds are the dicarboxylic acids containing from 2 to 10 carbon atoms, such as succinic, adipic, maleic, phthalic, isophthalic, and the like. Particularly preferred polycarboxylic acids are the aromatic dicarboxylic acids, containing from 6 to 10 carbon atoms wherein the two carboxyl groups are attached directly to the aromatic nucleus.

In some cases it may be desirable to utilize other forms of the acids, such as the acid anhydrides or acid chlorides, as phthalic anhydride, isophthaloyl chloride, maleic anhydride, and the like.

The esters of the polybasic acids may be utilized in case the alkyds are to be produced by an ester exchange reaction. Preferred derivatives to be used for this purpose comprise the esters of the above-described acids and the lower saturated monohydric alcohols, preferably those containing from 1 to 5 carbon atoms, such as methyl alcohol, ethyl alcohol, and amyl alcohol.

The polyhydric alcohols used in the preparation of the alkyds of the invention are those containing at least three esterifiable hydroxyl groups. Illustrative examples of such alcohols are glycerol, polyglycerol, pentaerythritol, mannitol, trimethylolpropane 1,2,6-hexanetriol, dipentaerythritol, polyallyl alcohol, polymethallyl alcohol, polyols formed by the condensation of bisphenols with epichlorohydrin, and the like.

Preferred polyhydric alcohols to be used in the preparation of the alkyds are the aliphatic alcohols possessing from 3 to 6 hydroxyl groups and containing from 3 to 14 carbon atoms, such as glycerol pentaerythritol, mannitol, 1,4,6-octanetriol, and 1,3,5-hexanetriol.

The polyhydric alcohol (polyol) should contain an average of from about 2.5 to about 4.5 hydroxyl groups per molecule and, preferably, about 3 hydroxyl groups per molecule.

A wide variety of unsaturated fatty acids may be utilized in the preparation of modified alkyd resins, the source of the fatty acid normally being a naturally occurring vegetable or marine oil. Thus, there may be used the polyethylenic acids derived from the drying oils, and their derivatives, such as their esters, and the like.

Examples of these acids and derivatives include the acids derived from oils such as linseed, soyabean, perilla, oiticia, tung, walnut, and dehydrated castor oil, as linoleic, linolenic, 9,12-octadecadienoic, 9,12,15-octadecatrienoic, and elaeostearic acid; the monohydric alcohol esters of the drying oil acids, such as methyl elaeostearate, butyl elaeostearate, ethyl 9,12-octadecadienoate, butyl 9,12,15-octadecatrienoate, and octyl 9,12-octadecadienoate; the glycerides of the fatty acids of the drying oils, such as the monoglyceride of the linseed oil acids, the diglyceride of the soyabean acids, the monoglyceride of the tung oil acids, and the drying oils themselves, such as tung oil, soyabean oil, hempseed, sardine, and the like.

The preferred modifiers comprise the drying oil fatty acids and their mono- and diglyceries. Particularly preferred modifiers are the drying oil fatty acids containing at least 12 carbon atoms.

If desired, other modifiers in addition to those described above may be utilized in the preparation of the novel alkyds. Such modifiers include the protein plastics, natural resins as rosin, synthetic resins as the nitrocellulose, phenol-formaldehyde, urea-formaldehyde and melamine type resins, synthetic resins obtained by the addition polymerization of unsaturated compounds, such as styrene, alpha-methylstyrene, vinyl chloride, vinylidene chloride, vinyl acetate, methyl acrylate, methyl methacrylate, and the like, as well as mixtures thereof.

In general, the polybasic acid, polyol, and fatty acid are interreacted in proportions sufficient to provide about a 5 to 25 weight percent excess of polyol. Excess polyol may be defined as that amount of polyol in excess of the amount necessary to combine with the sum of the acid groups in the fatty acid and the polybasic acid on a theoretical basis. Alkyd resins are conventionally characterized as short oil alkyd resins, medium oil alkyd resins, and long oil alkyd resins, depending upon the ratio of fatty acid to the dibasic acid in the preparation of the resin. Long oil alkyd resins are normally prepared by the interreaction of about 3.1 to about 3.4 mol equivalents of polyol with about 2 mol equivalents of polycarboxylic acid and 1 mol equivalent of unsaturated fatty acid. Progressively larger amounts of polycarboxylic acid and progressively smaller amounts of unsaturated fatty acid are utilized to provide for a shorter oil length. Thus, short oil alkyd resins may be prepared by the intercondensation of about 3.1 to about 3.4 mol equivalents of polyol with about 2.3 to about 2.5 mol equivalents of polycarboxylic acid and from about 0.7 to about 0.5 mol equivalent of unsaturated fatty acid.

Accordingly, the alkyd resin compositions of the present invention may be defined as intercondensation products of about 3.1 to about 3.4 mol equivalents of a polyol containing about 2.5 to 4.5 hydroxyl groups per molecule with about 2 to 2.5 mol equivalents of a polycarboxylic acid and about 1 to about 0.5 mol equivalent of a modifier consisting of about 35 to 45 mol percent of an unsaturated fatty acid and, correspondingly, from about 65 to 55 mol percent of 2,5-dihydroxybenzoic acid. Thus, improved short oil, medium oil and long oil alkyd resins are provided in accordance with the present invention. The improvement is most pronounced with long oil alkyd resins.

The invention will be further illustrated by the following specific examples which are given by way of illustration and not as limitations on the scope of this invention.

EXAMPLE I

A plurality of alkyd resins were prepared utilizing phthalic anhydride, glycerol, soya fatty acids and, except for the base resin, an aromatic monocarboxylic acid. The amount of fatty acid utilized in preparing each of the resins determined by the extent to which the fatty acid was to be replaced, on a molar basis, by the aromatic monocarboxylic acid. About a 6 to 7 percent molar excess of glycerol was used in order to obtain equivalent degrees of polymerization.

All of the ingredients were charged at once to a flask fitted with a reflux condenser connected to a Dean Stark tube. The charge was heated to a temperature of about 450° F. over a 3 to 4 hour period and maintained at this temperature for about 5 to 3 hours. An atmosphere of refluxing xylene vapor was maintained over the cook and vigorous agitation was employed. Water was azeotropically removed as evolved during the course of the reaction.

At the end of the reaction, the alkyd resin was diluted while hot with solvent xylenes to provide alkyd resin formulations containing about 40 to 60 weight percent of resin solids. After cooling, air-dried films having a thickness of about 0.001 inch and baked films of about 0.0005 inch thickness were formed from the resin without the use of extraneous driers. The air-dried films were prepared and cured at 75° F. and 50 percent relative humidity; the baked films were cured at 250° F. for 30 minutes. The films were tested for their physical properties.

In Table I there is listed the aromatic monocarboxylic acid modifiers employed, the extent to which the fatty acid was replaced with the acid modifier on a mol percent basis, and the weight percent of acid modifier utilized, based upon the total charge. In addition, the drying time of the alkyd resins prepared in the above-described fashion is given, together with the hardness of films prepared by drying of the alkyd resin compositions. The drier concentration employed for the air drying tests was about 0.5 weight percent of lead and about 0.05 weight percent of cobalt, based on the weight of the resin solids, and was added to the alkyd resin as a solution of cobalt and lead naphthenate. For the baked film tests, the cobalt salt was employed in an amount sufficient to provide 0.02 weight percent cobalt.

Table I.—Composition and physical characteristics of glycerine-phthalic-soya alkyd resins containing 2,5-dihydroxybenzoic acid

| | | | | Base |
|---|---|---|---|---|
| Modifier: | | | | |
| Mol equivalent replacement | 40 | 50 | 60 | 0 |
| Weight, percent | 14.4 | 18.6 | 23.0 | 0 |
| Fatty acid, percent | 39.6 | 34.0 | 28.0 | |
| Final acid number | 8.2 | 10.0 | 10.0 | |
| Dry time, hours to tack free | 100 | 100 | 0.5 | 100 |
| Sward hardness: | | | | |
| Bake, 48 hours | 6 | Tacky | 28 | 10 |
| Air dry: | | | | |
| 7 days | 6 | 6 | 14 | |
| 14 days | 16 | 10 | 20 | |
| 28 days | 16 | 12 | 22 | 2 |
| Chemical resistance: | | | | |
| Bake | Poor | Poor | Good | Poor |
| Air dry | Poor | Poor | Good | Poor |

From Table I it will be seen that unsatisfactory results are obtained with 2,5-dihydroxybenzoic acid when less than about 55 mol percent of the fatty acid is replaced with 2,5-dihydroxybenzoic acid. However, when the replacement is within the range of about 55 to 65 mol percent, excellent results are obtained as is evidenced by the very rapid drying time of about 30 minutes, the excellent hardness characteristics of the films, and the good chemical resistance of the films.

EXAMPLE II

Alkyd resins were prepared by the intercondensation of glycerin (95 percent), phthalic anhydride, soya fatty acids and 2,4-dihydroxybenzoic acid.

In preparing the resin, a glass flask was fitted with a glass stirrer, a thermometer, a water jacketed reflux condenser, a Dean Stark water trap, and an inert gas inlet for introducing carbon dioxide below the surface of the material. The reactants were added to the flask, together with an amount of xylenes sufficient to provide for a comparatively high rate of reflux. Thereafter, the reaction mixture was brought to reaction temperature (about 450° F.) over a period of about 3 hours. At the end of the reaction, the alkyd resin was diluted while hot with solvent xylenes to provide an alkyd containing about 60 weight percent of resin solids. After cooling, films having a thickness of about 0.001 inch were formed from the alkyd resin without the use of an extraneous drier. The films would not dry. The results of this experiment are set forth in Table II.

Table II.—Composition and physical characteristics of glycerine-phthalic-soya alkyd resins containing 2,4-dihydroxybenzoic acid

| Modifier: | | |
|---|---|---|
| Mol equivalent replacement | 60 | 40 |
| Weight, percent | 23.0 | 14.5 |
| Fatty acid, percent | 28.0 | 39.6 |
| Final acid number | 10 | |
| Dry time, hours to tack free | (¹) | (¹) |

¹ Would not dry.

From the foregoing it is seen that rapidly drying alkyd resins which will form films having excellent physical properties may be prepared by replacing 55 to 65 mol percent of the unsaturated fatty acid with 2,5-dihydroxybenzoic acid. It is further seen that unsatisfactory results are obtained with isomeric dihydroxybenzoic acids or with lesser amounts of 2,5-dihydroxybenzoic acid.

Having described our invention, what is claimed is:

1. An alkyd resin composition comprising the intercondensation product of about 3.1 to about 3.4 mol equivalents of a polyol containing an average of from about 2.5 to 4.5 hydroxyl groups per molecule with from about 2 to 2.5 mol equivalents of a polycarboxylic acid and, correspondingly, from about 1 to about 0.5 mol equivalent of a modifier component consisting of about 35 to 45 mol percent of an unsaturated fatty acid and, correspondingly, about 65 to 55 mol percent of 2,5-dihydroxybenzoic acid.

2. An alkyd resin coating composition as in claim 1 wherein the polyol is glycerol and the dicarboxylic acid is phthalic anhydride.

3. An alkyd resin coating composition as in claim 1 wherein the polyol is glycerol, the dicarboxylic acid is phthalic anhydride, and the fatty acid is soya fatty acids.

References Cited in the file of this patent
UNITED STATES PATENTS

| | | |
|---|---|---|
| 2,197,855 | Ellis | Apr. 23, 1940 |
| 2,618,616 | Tess et al. | Nov. 18, 1952 |